United States Patent
Ahmed et al.

(10) Patent No.: US 10,568,025 B2
(45) Date of Patent: Feb. 18, 2020

(54) POWER MANAGEMENT IN WIRELESS COMMUNICATIONS DEVICES

(71) Applicant: Nitero Pty Ltd., Fitzroy, Victoria (AU)

(72) Inventors: Sebastian Ahmed, Austin, TX (US); Douglas A. Mammoser, Austin, TX (US)

(73) Assignees: ADVANCED MICRO DEVICES, INC., Sunnyvale, CA (US); AMD FAR EAST LTD., Sydney (AU)

( * ) Notice: Subject to any disclaimer, the term of this patent is extended or adjusted under 35 U.S.C. 154(b) by 387 days.

(21) Appl. No.: 14/798,150

(22) Filed: Jul. 13, 2015

(65) Prior Publication Data

US 2017/0019850 A1 Jan. 19, 2017

(51) Int. Cl.
*H04W 52/02* (2009.01)
*H04L 12/54* (2013.01)
*H04W 4/18* (2009.01)

(52) U.S. Cl.
CPC ......... *H04W 52/0209* (2013.01); *H04L 12/56* (2013.01); *H04W 4/18* (2013.01)

(58) Field of Classification Search
CPC ............. H04W 52/0209; H04W 28/06; H04W 28/065; Y02B 60/50
See application file for complete search history.

(56) References Cited

U.S. PATENT DOCUMENTS

| | | | | |
|---|---|---|---|---|
| 6,738,871 | B2 * | 5/2004 | Van Huben | G06F 15/17381 711/124 |
| 7,558,890 | B1 * | 7/2009 | Li | H04L 47/52 370/230.1 |
| 2007/0230493 | A1 * | 10/2007 | Dravida | H04L 47/14 370/412 |
| 2011/0275331 | A1 * | 11/2011 | Wang | H04W 52/146 455/73 |
| 2012/0117446 | A1 * | 5/2012 | Taghavi Nasrabadi | H04L 1/0003 714/776 |
| 2013/0124829 | A1 * | 5/2013 | Chou | G06F 1/3275 712/207 |
| 2015/0178089 | A1 * | 6/2015 | Brunheroto | G06F 9/3851 712/215 |
| 2016/0119811 | A1 * | 4/2016 | Merlin | H04L 1/00 370/329 |

* cited by examiner

*Primary Examiner* — Walter J Divito
*Assistant Examiner* — Anthony Luo
(74) *Attorney, Agent, or Firm* — Hickman Palermo Becker Bingham LLP; Edward A. Becker

(57) ABSTRACT

An approach is provided for data processing methods wherein a PHY layer transmit operation is constructed by aggregating MAC layer data units (MPDUs) by means of a linked list. A link list of TX descriptors can be formed separately from the payloads. In order to minimize processor speed rates, the next transmission buffer is pre-fetched whenever appropriate. Interlocks are used to prevent conflict on descriptor fetches and payload fetches.

19 Claims, 4 Drawing Sheets

POWER MANAGEMENT IN WIRELESS COMMUNICATIONS DEVICES

FIELD

The disclosed technologies relate generally to wireless communications, and more particularly, to reducing power consumption in mobile wireless communications devices.

BACKGROUND

The availability of unlicensed millimeter wave (mm-wave) radio frequency (RF) bands is spurring the development of main stream applications that use mm-wave wireless technologies. For example, the Institute of Electrical and Electronics Engineers (IEEE) 802.11ad standard, sometimes referred to as "Wi-Gig", specifies a data rate of up to approximately 7 Gigabits per second over the 60 GHz frequency band for consumer applications such as wireless transmission of high-definition video.

Wireless communications devices that use high frequency bands, such as the 60 GHz frequency band, require that large and high throughput packets be constructed and transmitted with very precise timing requirements.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are described with reference to figures in which like reference numerals refer to corresponding elements throughout the figures.

DETAILED DESCRIPTION

Figure 1A:
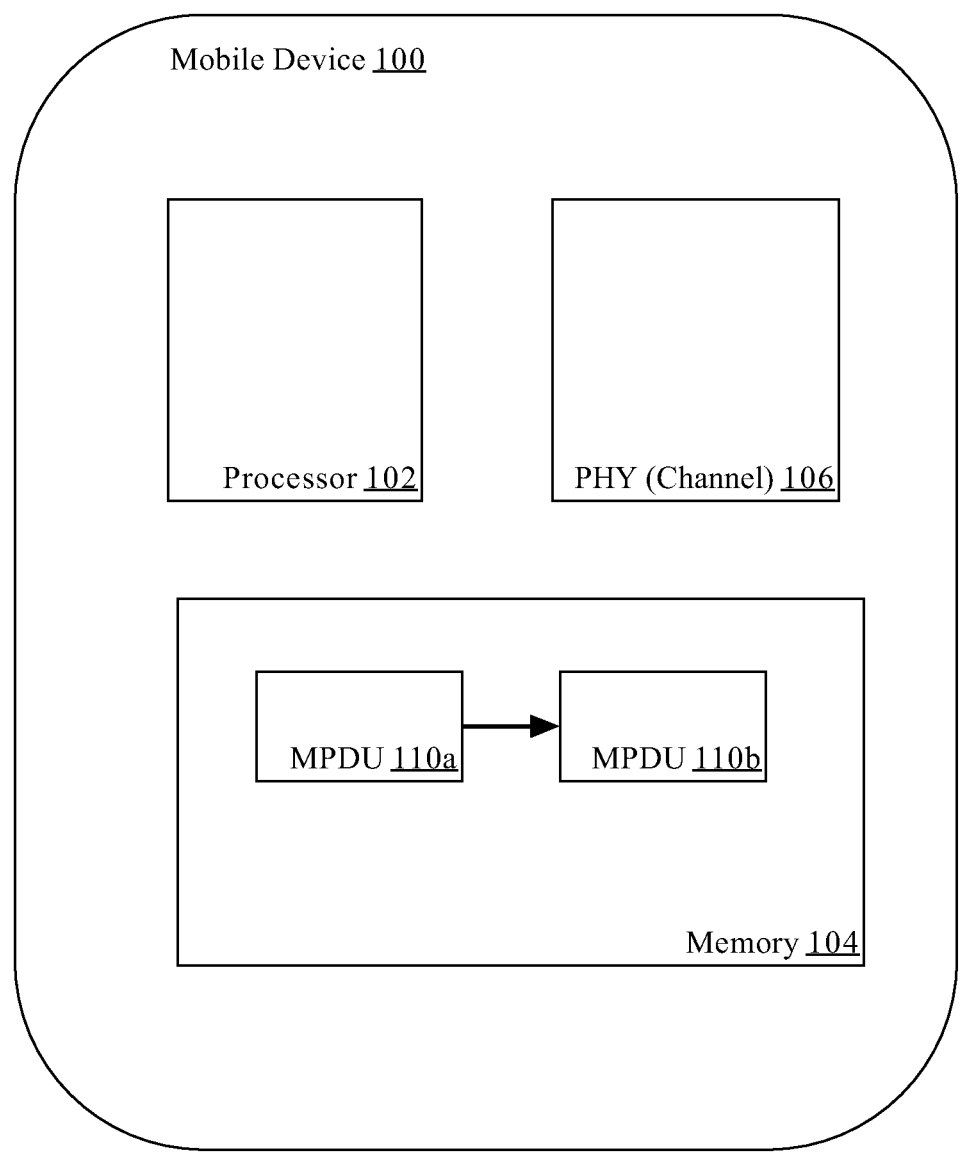
FIG. 1A depicts an example mobile device in which embodiments may be implemented.

In the following description, for the purposes of explanation, numerous specific details are set forth in order to provide a thorough understanding of various embodiments. It will be apparent, however, that embodiments may be practiced without these specific details. In other instances, well-known structures and devices are depicted in block diagram form in order to avoid unnecessarily obscuring the embodiments.

It should be understood that, although the terms first, second, etc. may be used herein to describe various elements, these elements should not be limited by these terms. These terms are only used to distinguish one element from another. For example, a first media access control (MAC) protocol data unit (MPDU) could be termed a second MPDU, and similarly, a second MPDU could be termed a first MPDU.

The terminology used in the description herein is for the purpose of describing example embodiments only and is not intended to be limiting. As used in the description of the example embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will further be understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Methods and systems disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include a transitory and/or non-transitory medium. The processor may include a general purpose instruction processor, a controller, a microcontroller, and/or other instruction-based processor. Embodiments described herein may further be employed in Radio Frequency Integrated Circuits (RFICs) and devices that cover wide frequency ranges including, without limitation, the 60 GHZ frequency band. In such applications, the adaptive equalization system may be implemented to operate on Wigig and other high frequency signals.

I. OVERVIEW
II. ARCHITECTURE OVERVIEW
III. CHANNEL STRUCTURE
IV. PRE-FETCH OPERATION

I. Overview

An approach is provided for configuring and processing physical-layer transmit operations in mobile devices configured to operate under the "Wi-Gig" standard. In order to comply with the tight timing requirements for transmission imposed by the WiGig standard, a physical-layer transmit operation is constructed from a plurality of MAC protocol data units (MPDUs) that are combined in a linked list to create a channel. Channels may be combined with other channels to form transmission bursts. Pre-fetching methods may be used to improve the efficiency and functioning of transmission by initiating a subsequent data fetching operation while an active transmission is ongoing. This approach provides sufficient range and performance to allow a mobile device to operate in high frequency bands, such as the 60 GHz frequency band, with lower processor speeds, and reduced power consumption, complexity and size.

II. Architecture Overview

FIG. 1A depicts an example mobile device 100 in which embodiments may be implemented. Mobile device 100 includes a processor 102 and memory 104, and may include other components. Stored in memory 104 are MAC ("Media Access Control") protocol data units ("MPDU"s), in this example two MPDUs 110a, b for purposes of explanation only, but the number of MPDUs may vary depending upon a particular implementation and as can be accommodated by the size of the memory 104. A physical layer ("PHY") transmit operation ("a channel") 106 is also stored on the mobile device 100, though not necessarily in memory 104. Example implementations of mobile device 100 include, without limitation, smart phones, tablet computing devices, laptop computers, personal digital assistants, etc.

In one embodiment, each MPDU 110a, b is a MAC protocol data unit exchanged between media access control (MAC) entities in a communication system based on the layered OSI model. In other embodiments, each MPDU 110a, b may be any packet or unit of data comprising a transmit buffer descriptor portion and a transmit buffer payload portion. Furthermore, each MPDU 110a, b may be configurable and controlled and implemented in firmware and/or in hardware or using any other suitable method. Two or more MPDUs may be combined to form an aggregate MPDU (AMPDU). Although embodiments are described herein in the context of two MPDUs 110a, b, this is done for purposes of explanation only, and embodiments are applicable to any number of MPDUs of the same or varying types.

In general, each MPDU 110a, b transmit buffer descriptor portion contains information that includes a transmit and receive address identifying the source and destination of the MPDU, miscellaneous control information and payload information. The transmit buffer payload portion may contain a management message, user data, or any other type of information. The structure of an MPDU is explained greater detail in the section below entitled CHANNEL STRUCTURE.

A channel 106 is a physical layer transmit operation. The physical layer modulates digital data to analog signals transmitted by a radio antenna, or by a traditional metal conductor, for example. The physical layer also demodulates received analog signals. These operations occur without regard to the specifications of the upper layers such as the MAC layer. The physical layer operates according to, for example, WiGig standards regulating signal strength, timing, data rates, maximum transmission distances, and the like.

In one embodiment, a channel 106 comprises a plurality of MPDUs together with associated interframe spaces (IFS). A channel may be constructed or initiated by any number of methods, for example by a system timer event, by interframe spacing requests such as RIFS or SBIFS, or by fully controlled firmware methods. A channel 106 may itself initiate other channels after the completion of a suitable interframe spacing time (IFS). A channel 106 may be combined with and chained with other channels 106 in order to meet timing or transmission requirements. The interframe spacing time may be firmware-controllable, or may be handled by hardware. Aggregating several MPDUs into a single channel 106 reduces demands on the processor and allows for slower, less costly processors to be used in mobile device 100 without compromising the strict timing requirements imposed by WiGig and other standards.

Figure 1B:
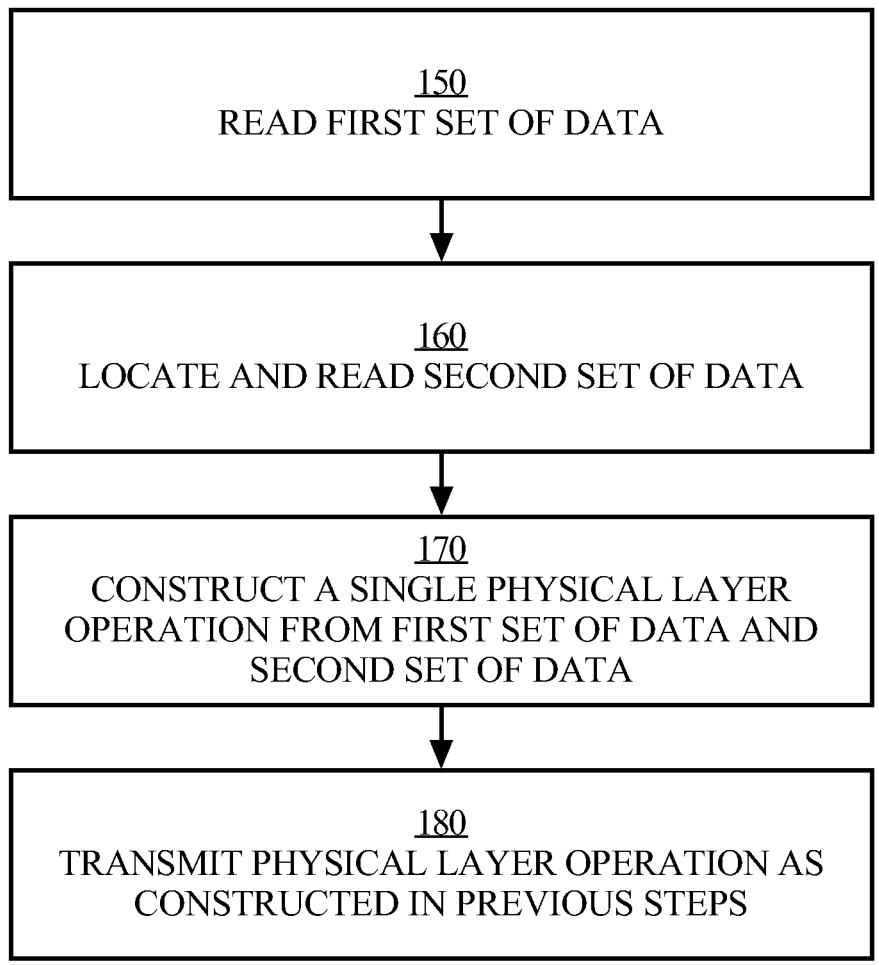
FIG. 1B a flow chart of a data processing method according to an embodiment

FIG. 1B depicts a flow chart of a data processing method according to one embodiment. In step 150 processor 102 reads from memory 104 a first set of data for a first MPDU 110a. The first set of data may be a transmit buffer descriptor portion, a transmit buffer payload portion, or any other suitable set of data. The processor 102 may access the memory 104 using direct memory access (DMA) or any other suitable method. In step 160, processor 102 locates and reads the second set of data for the second MPDU 110b of the physical layer transmit operation 106. According to one embodiment, processor 102 locates the second set of data using a reference or pointer to the second MPDU 110b contained in the first MPDU 110a. In step 170, processor 102 constructs a single physical layer transmit operation 106 by reading from memory first MPDU 110a and second MPDU 110b, wherein the first MPDU 110a and the second MPDU 110b are connected by a reference or pointer contained in the first MPDU 110a. In other embodiments, processor 102 may construct multiple channels 106 as required and as permitted by the capacity of memory 104 and the timing requirements imposed by the operating standard, such as WiGig. In step 180, the processor 102 transmits the physical layer transmit operation 106 according to destination address data contained in the MPDUs 110a-b.

In one embodiment, an MPDU completion interrupt is used to track the current processing point of processor 102 in the linked list ("chain") of MPDUs to allow additional MPDUs to be processed if required. In another embodiment, the MPDU completion interrupt can be implemented in firmware.

While some embodiments are described herein in the context of the plurality of MPDUs being implemented in the firmware of the mobile device for purposes of explanation, embodiments are not limited to this arrangement and some or all of the MPDUs may be implemented in hardware or utilizing a central processing unit.

III. Channel Structure

In a transmit operation, multiple MPDUs are aggregated into a single physical layer transmit operation in order to improve efficiency of construction and transmission of data packets.

Figure 2:
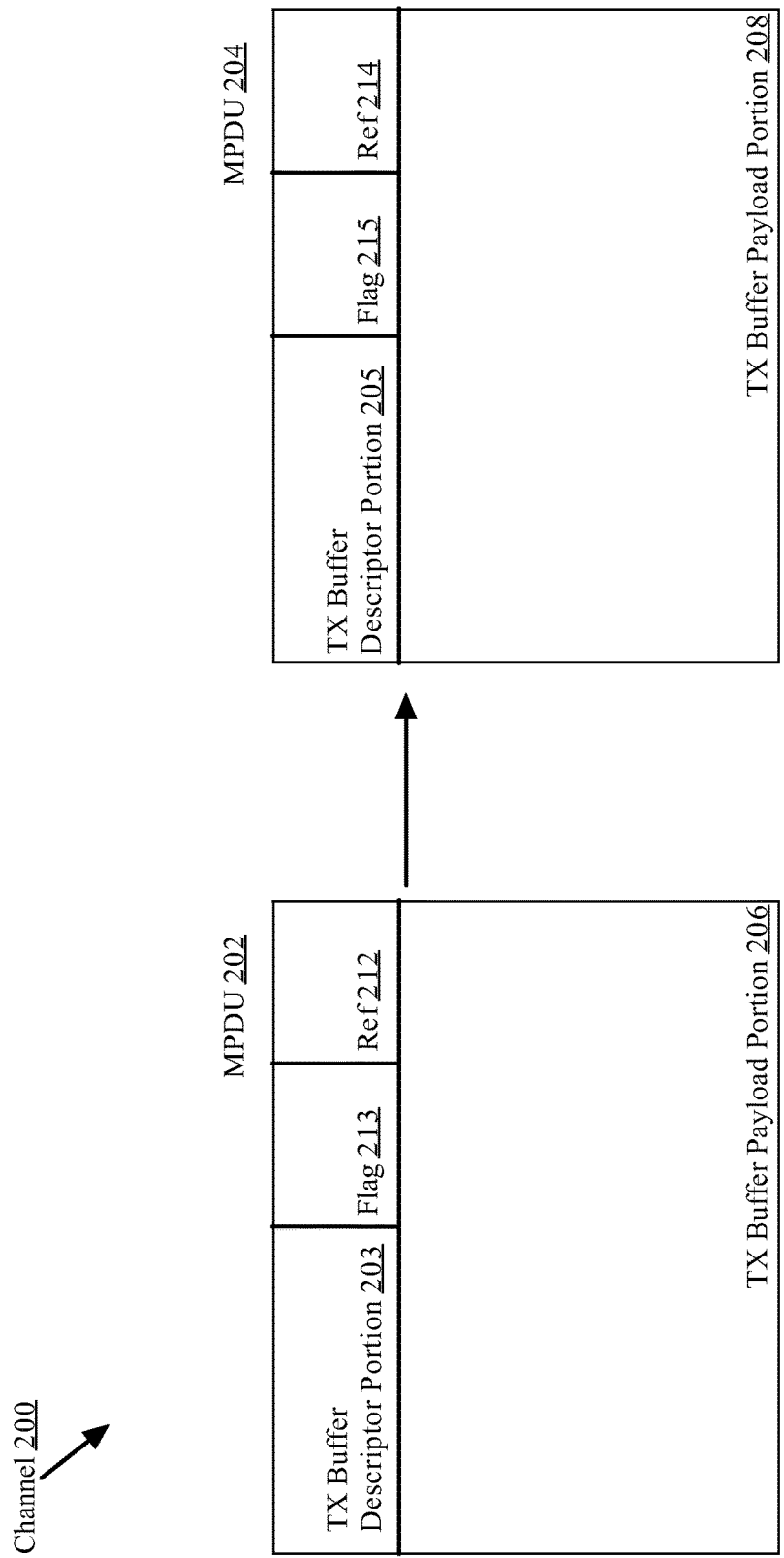
FIG. 2 depicts an example channel according to an embodiment.

FIG. 2 is a block diagram that depicts an example physical layer transmit operation ("channel") 200 according to an embodiment. In this example, a channel 200 comprises two MPDUs. Other channels may include several MPDUs or MPDUs along with other components depending upon a particular implementation, and channel 200 is not limited to any particular combination of components or elements. Example embodiments of a channel 200 include, without limitation, PHY transmit operation, a PHY packet layer operation, a TXVECTOR, and a PSDU.

In the example channel 200, each MPDU 202, 204 can include a transmit (TX) buffer descriptor portion 203, 205 and a transmit buffer payload portion 206, 208. Although each MPDU 202, 204 is shown here for the purpose of illustration as comprising both a transmit descriptor portion and a payload portion, in some embodiments the payload portion 206, 208 may be omitted if appropriate. Each transmit buffer descriptor portion 203, 205 further comprises a reference 212, 214 to the next MPDU, as well as a Boolean flag 213, 215 which indicates whether or nor there is a next MPDU in the channel 200. Each transmit buffer descriptor portion 203, 205 and transmit buffer payload portion 206, 208 together form a description of the associated MPDU, so that the first MPDU comprises transmit buffer descriptor portion 203 and transmit buffer payload portion 206, and the second MPDU comprises transmit buffer descriptor portion 205 and transmit buffer payload portion 208. Each transmit buffer descriptor portion 203, 205 may contain other fields and other values, depending upon a particular implementation.

In one embodiment, each transmit buffer descriptor portion 203, 205 may be stored in memory space that is not adjacent to their associated payload portions 206, 208. Storing the portions in this manner can improve processing speeds and increase efficiency.

Each MPDU 202, 204 in the example channel 200 may be linked or chained to a different MPDU 202, 204. In one embodiment, a first MPDU 202 is linked to the second MPDU 204 by a reference or pointer 212 stored within the transmit buffer descriptor portion 203 of the first MPDU 202. In one embodiment, the reference or pointer 212 is the logical address of the second MPDU 204. In another embodiment, the pointer 212 comprises the logical address of the second MPDU 204 together with information about the size of the second MPDU 204. In another embodiment, the pointer 212 further comprises a Boolean flag 215 indicating whether a valid reference to a different MPDU exists. If flag 215 has a value of "TRUE", the pointer 212 contains a reference to a valid subsequent MPDU and the construction of the channel 200 will proceed. If flag 215 has a value of "FALSE", the pointer 212 is not pointing to a valid further MPDU and may be ignored during the construction of the channel 200. In one embodiment, pointer 212 is dynamically configured by firmware in order to link the MPDUs 202, 204 forming the channel 200. Using this approach, a TXVector is only needed for the first MPDU in an AMPDU.

Channel 200 may be further combined with other physical layer transmit operations without regard to the context of each particular channel. For example, a channel 200 can comprise two MPDUs and be chained to a second channel comprising three MPDUs (or any other number of MPDUs).

IV. Pre-Fetch

The data processing methods disclosed herein may include the use of pre-fetching to further improve performance. Pre-fetching allows for multiple transmit operations to be processed simultaneously. Pre-fetching of each subsequent set of data occurs during idle processor cycles. Transmit buffer descriptor portions and payload portions comprising each MPDU are fetched from memory in separate operations.

According to one embodiment, a second transmit buffer descriptor portion is pre-fetched while a previous transmit buffer descriptor portion is still being processed to allow for lower processor speeds and reduced power consumption. Prefetching of the second transmit buffer descriptor portion may be performed immediately after fetching of the first transmit buffer descriptor portion has been completed. In one embodiment, the first or the second transmit buffer descriptor portion may be pre-fetched prior to the first transmit of a first data frame identified by the first transmit buffer descriptor portion. In another embodiment, the second transmit buffer descriptor portion may be fetched later, but prior to the completion of the first transmit of the data frame identified by the first transmit buffer descriptor portion. Every transmit buffer descriptor portion thereafter may be fetched as soon as possible as long as the device memory has room for storing another channel. The pre-fetched second transmit buffer descriptor portion may be stored in a local buffer so that there is no delay incurred by fetching descriptors.

Figure 3:
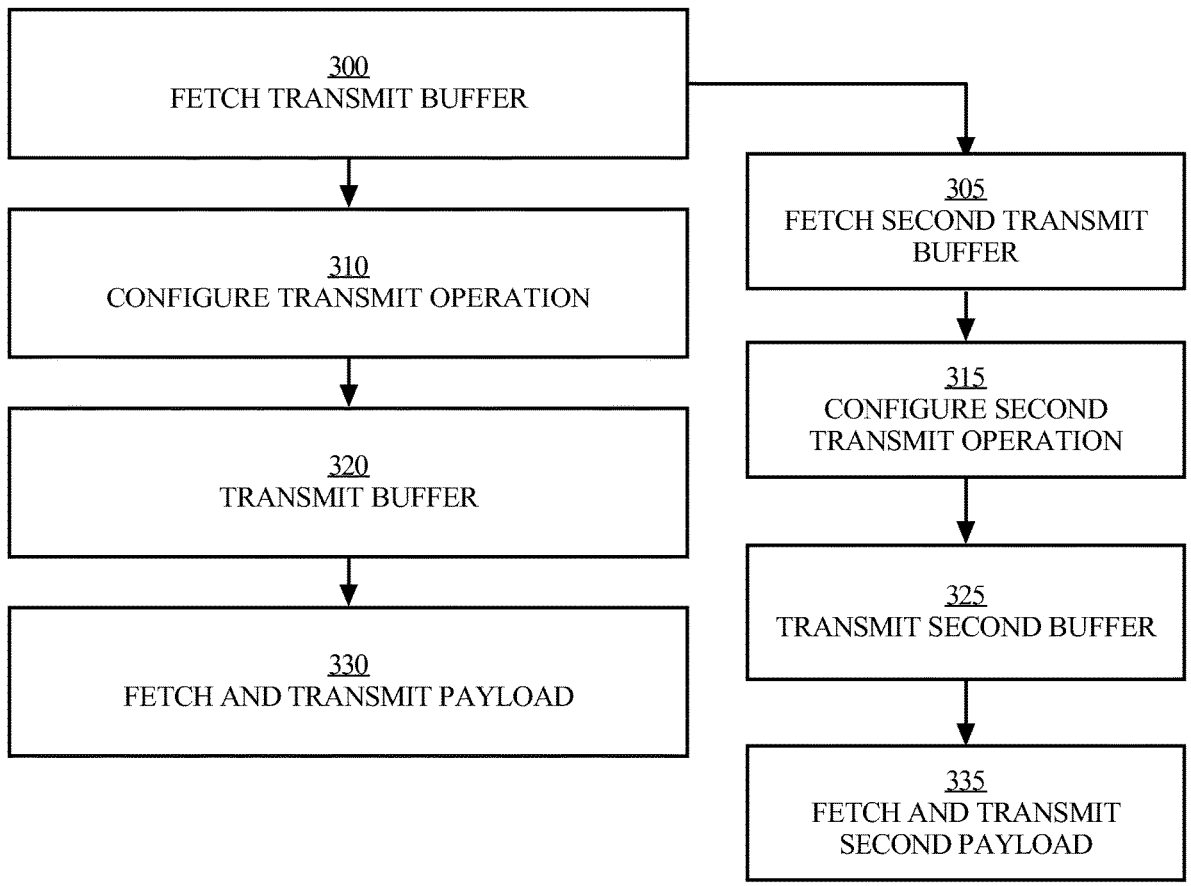
FIG. 3 is a flow chart of a prefetching data processing method according to an embodiment.

FIG. 3 is a flow diagram that depicts an approach for a mobile device that uses a pre-fetching method of constructing physical transmit operations, according to an embodiment. In step 300, a first transmit buffer descriptor portion is fetched from memory in preparation for the channel construction. As before, the transmit buffer descriptor portion may be fetched using DMA, or any other appropriate method of accessing memory.

In step 305, a second transmit buffer descriptor portion is pre-fetched to prepare for the next physical layer transmit operation. Step 305 may commence immediately following the completion of step 300 and in parallel with steps 310-330.

In step 310, the physical layer transmit operation for the first transmit buffer descriptor portion is configured, as explained in greater detail above. In step 320, the first transmit buffer descriptor portion is transmitted. In step 330, the transmit buffer payload portion associated with the first transmit buffer descriptor portion is fetched from memory and transmitted.

While steps 310-330 are proceeding, in step 305 the processing of a second channel construction operation is performed in parallel with the first channel processing operation. In step 315, the physical layer transmit operation for the second (pre-fetched) transmit buffer descriptor portion is configured. In step 325, the second buffer descriptor portion is transmitted. In step 335, the transmit buffer payload portion associated with the second transmit buffer descriptor portion is fetched and transmitted.

In one embodiment, a new pre-fetch cycle starts following the completion of step 305, wherein a further transmit buffer descriptor portion is pre-fetched during idle processor cycles while steps 315, 325 and 335 are being performed.

Situations may occur in which pre-fetching a next transmit buffer descriptor portion causes a conflict between buffer memory fetches, wherein a collision occurs at the memory register between active pre-fetch requests and payload requests, as well as subsequent prefetch requests and payload requests. To prevent simultaneous access to the same memory register by multiple transmit buffers, an interlock may be used to monitor for channel request collisions. In the event that a channel request collision is detected, the interlock ensures that the previous pre-fetch is complete, before allowing the current pre-fetch request to access the memory registers. For example, an interlock can be implemented in the context of a finite state machine The approaches described herein may be selectively implemented on particular devices. For example, the approaches may be implemented on mobile devices, such as a mobile device 100, where lower processor speeds leading to lower power consumption while maintaining high data throughput is desirable. The use of the approaches described herein may be determined, for example, based upon a configuration of a mobile device, or the use may be selectable by a user, for example, via an application on the mobile device.

In the foregoing specification, embodiments are described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A mobile device comprising:
a memory; and
a processor operable to:
prepare for a first physical layer transmit operation by:
reading, from the memory, a first set of data for a first media access control (MAC) protocol data unit (MPDU) of the first physical layer transmit operation, wherein the first set of data for the first MPDU of the first physical layer transmit operation includes a reference to a second set of data for a second MPDU of the first physical layer transmit operation, and using the reference to the second set of data for the second MPDU of the first physical layer transmit operation included in the first set of data for the first MPDU of the first physical layer transmit operation to locate and read the second set of data for the second MPDU of the first physical layer transmit operation,
wherein the first MPDU and the second MPDU comprise a first aggregate MPDU (AMPDU), and
prior to completion of processing of the first physical layer transmit operation, prepare for a second physical layer transmit operation by:
reading, from the memory, a third set of data for a first MPDU of the second physical layer transmit operation, wherein the third set of data for the first MPDU of the second physical layer transmit operation includes a reference to a fourth set of data for a second MPDU of the second physical layer transmit operation, and
using the reference to the fourth set of data for the second MPDU of the second physical layer transmit operation included in the third set of data for the first MPDU of the second physical layer transmit operation to locate and read the fourth set of data for the second MPDU of the second physical layer transmit operation,
wherein preparing the second physical layer transmit operation is performed during idle processor cycles and using one or more data interlocks to prevent preparing the second physical layer transmit operation before completing preparation of the first physical transmit operation.

2. The mobile device of claim 1, wherein:
each of the first set of data for the first MPDU and the second set of data for the second MPDU includes a transmit buffer descriptor portion and a transmit buffer payload portion, and
the reference to the second set of data for the second MPDU is included in the transmit buffer descriptor portion of the first set of data for the first MPDU.

3. The mobile device of claim 1, wherein:
the reference to the second set of data for the second MPDU of the first physical layer transmit operation comprises a logical address associated with the second MPDU.

4. The mobile device of claim 1, wherein:
the first set of data and the second set of data are separated by an interframe space.

5. The mobile device of claim 1, wherein:
the reference to the second set of data for the second MPDU of the first physical layer transmit operation comprises a logical address of the second MPDU and a size of the second MPDU.

6. The mobile device of claim 1, wherein:
the reference to the second set of data for the second MPDU of the first physical layer transmit operation included in the transmit buffer descriptor portion of the first set of data for the first MPDU of the first physical layer transmit operation comprises a Boolean flag indicating that a second set of data for the second MPDU is the last MPDU in the first physical layer transmit operation.

7. The mobile device of claim 1, wherein:
the reference to the second set of data for the second MPDU of the first physical layer transmit operation comprises a Boolean flag indicating that the second MPDU is the next MPDU in the physical layer transmit operation.

8. The mobile device of claim 1, wherein the first or second physical layer transmit operation further comprises a MPDU completion interrupt.

9. The mobile device of claim 1, wherein reading, from the memory, a first set of data for the first MPDU of the first physical layer transmit operation is performed using a direct memory access (DMA) operation.

10. The mobile device of claim 1, wherein:
the memory further stores data that logically associates the first and second sets of data for the first and second MPDUs of the first physical layer transmit operation with the third and fourth sets of data for the first and second MPDUs of the second physical layer transmit operation.

11. A method for processing data comprising:
fetching a first transmission buffer;
reading a first set of data from a memory;
reading a second set of data from the memory;
preparing the first transmission buffer by:
constructing a first media access control (MAC) protocol data unit (MPDU) based, at least in part, on the first set of data;
constructing a second MPDU based, at least in part, on the second set of data; and
chaining the first MPDU to the second MPDU to create a first aggregate media access control protocol data unit (AMPDU); and
storing the first AMPDU in the first transmission buffer; and
prior to completing processing of the first AMPDU, fetching and storing in a second transmission buffer a second AMPDU that includes a first MPDU chained to a second MPDU, wherein fetching and storing the second AMPDU in the second transmission buffer is performed during idle processor cycles and using one or more data interlocks to prevent fetching and storing the second AMPDU in the second transmission buffer before completing preparation of the first transmission buffer.

12. The method of claim 11, wherein the fetching a second transmission buffer occurs during idle processor cycles.

13. The method of claim 11, further comprising one or more data interlocks.

14. The method of claim 13, wherein the one or more data interlocks prevents the fetching of the second transmission buffer from commencing before the preparing the first transmission buffer is completed.

15. The method of claim 11, wherein data for the second AMPDU and the first set of data are interleaved.

16. The method of claim 11, wherein chaining the first MPDU to the second MPDU to create the first AMPDU includes including, in the first MPDU of the first AMPDU, a logical address that corresponds to the second MPDU.

17. The method of claim 11, wherein chaining the first MPDU to the second MPDU to create the first AMPDU includes including, in the first MPDU of the first AMPDU, both a logical address that corresponds to the second MPDU and a size of the second MPDU.

18. The method of claim 11, wherein chaining the first MPDU to the second MPDU to create the first AMPDU includes including, in the first MPDU of the first AMPDU, a Boolean flag indicating that the second MPDU is a next MPDU in a physical layer transmit operation or a last MPDU in the physical layer transmit operation.

19. The method of claim 11, wherein constructing each of the first MPDU and the second MPDU of the first AMPDU includes creating a respective transmit buffer descriptor portion and a transmit buffer payload portion.

* * * * *